United States Patent
Danielpour et al.

(10) Patent No.: US 12,021,878 B2
(45) Date of Patent: Jun. 25, 2024

(54) UNAUTHORIZED ACTIVITY DETECTION BASED ON SPATIALLY AWARE DEVICES

(71) Applicant: Bank of America Corporation, Charlotte, NC (US)

(72) Inventors: Sophie Morgan Danielpour, New York, NY (US); Michael Robert Young, Davidson, NC (US)

(73) Assignee: Bank of America Corporation, Charlotte, NC (US)

(*) Notice: Subject to any disclaimer, the term of this patent is extended or adjusted under 35 U.S.C. 154(b) by 173 days.

(21) Appl. No.: 17/723,804

(22) Filed: Apr. 19, 2022

(65) Prior Publication Data

US 2023/0336564 A1 Oct. 19, 2023

(51) Int. Cl.
*H04L 9/40* (2022.01)
*G06N 20/00* (2019.01)

(52) U.S. Cl.
CPC .......... *H04L 63/107* (2013.01); *G06N 20/00* (2019.01); *H04L 63/0876* (2013.01); *H04L 63/20* (2013.01)

(58) Field of Classification Search
CPC ............................... G06N 20/00; H04L 63/20
USPC ............................................................ 726/4
See application file for complete search history.

(56) References Cited

U.S. PATENT DOCUMENTS

| | | | |
|---|---|---|---|
| 6,570,610 B1* | 5/2003 | Kipust | G06F 21/35 348/156 |
| 6,710,706 B1 | 3/2004 | Withington et al. | |
| 9,560,060 B2* | 1/2017 | Baxley | H04L 63/1416 |
| 9,794,789 B1* | 10/2017 | Coney | H04L 63/107 |
| 9,880,256 B2* | 1/2018 | Baxley | H04B 1/18 |
| 9,924,216 B2 | 3/2018 | Rittmaster et al. | |
| 11,258,807 B2* | 2/2022 | Muddu | H04L 43/062 |
| 2002/0171546 A1* | 11/2002 | Evans | G06F 21/554 340/568.1 |
| 2013/0012242 A1 | 1/2013 | Nag et al. | |

FOREIGN PATENT DOCUMENTS

| | | |
|---|---|---|
| CN | 105526934 A | 4/2016 |
| CN | 105682221 A | 6/2016 |
| JP | 2021013833 A | 2/2021 |

* cited by examiner

*Primary Examiner* — Badri Narayanan Champakesan
(74) *Attorney, Agent, or Firm* — Banner & Witcoff, Ltd.

(57) ABSTRACT

Arrangements for detecting unauthorized activity using spatially aware devices are provided. In some aspects, a computing device including a spatially aware chip may be detected at a location. An indication of device detection, as well as additional data may be captured and received. Upon a second detection of the computing device, additional data for that visit (e.g., a second visit, subsequent to a first visit to the location) may be captured and received. Earlier stored data associated with the device and/or spatially aware chip may be retrieved and compared to the additional for the second visit to detect one or more anomalies, determine a risk score for the device, and the like. Based on the detected anomalies and/or risk score, one or more mitigating actions may be identified and executed to mitigate the risk. Further, one or more alerts or notifications may be transmitted to one or more devices.

18 Claims, 11 Drawing Sheets

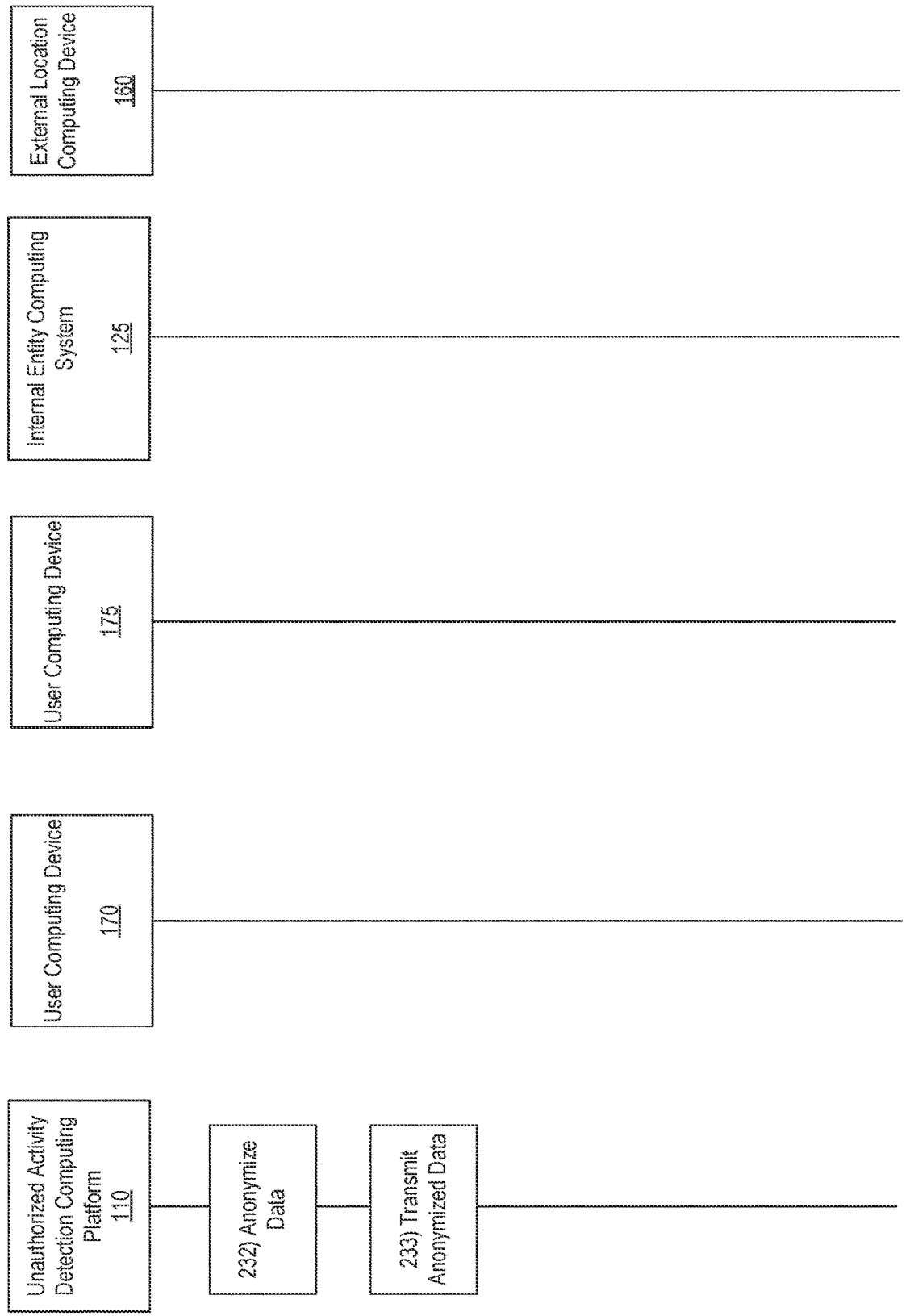

UNAUTHORIZED ACTIVITY DETECTION BASED ON SPATIALLY AWARE DEVICES

BACKGROUND

Aspects of the disclosure relate to electrical computers, systems, and devices for detecting unauthorized activity based on spatially aware devices.

Unauthorized activity is a concern for both enterprise organizations and customers or users. Accordingly, effective ways to detect unauthorized activity are needed. These days it can be safely assumed that the vast majority of people have a spatially aware device (e.g., smartphone, smart watch or the like including a spatially aware chip) with them at all or nearly all times. These devices, may be detected within a location, such as a retail location, financial institution branch of the like and used to identify unauthorized activity or potential unauthorized activity. Accordingly, it would be advantageous to detect a device and determine whether the device was previously associated with unauthorized activity or is likely to be involved in unauthorized activity and generate notifications or alerts indicating the potential unauthorized activity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated detecting unauthorized activity.

In some aspects, a computing device including a spatially aware chip may be detected at a location. An indication of device detection, as well as additional data may be captured and received. If the device was previously detected (e.g., as determined based on an identifier of the device or spatially aware chip being previously stored) the indication and received data may be stored with the previously stored data.

Upon a second detection of the computing device including the spatially aware chip, additional data for that visit (e.g., a second visit, subsequent to a first visit to the location) may be captured and received. Earlier stored data associated with the device and/or spatially aware chip may be retrieved and compared to the additional for the second visit to detect one or more anomalies, determine a risk score for the device, and the like.

Based on the detected anomalies and/or risk score, one or more mitigating actions may be identified and executed to mitigate the risk. Further, one or more alerts or notifications may be transmitted to one or more devices, such as a financial institution associate computing device, retail location computing device, administrator computing device, or the like. The alerts, notifications, and/or risk score may be transmitted to one or more entity or enterprise organization computing devices to modify one or more systems of the enterprise organization or entity to implement additional measures to mitigate risk.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing unauthorized activity detection functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized activity detection and mitigation are critical functions for enterprise organizations. As the majority of users carry at least one spatially aware device at most if not all times, detection of devices to determine whether a device present at a location was previously involved in unauthorized activity or may be facilitating unauthorized activity would be advantageous.

Accordingly, aspects described herein are directed to detecting spatially aware devices at locations and using contextual data to determine a likelihood of unauthorized activity. For instance, aspects described herein rely on detection of user computing devices having spatially aware chips to detect a presence of a device and associated user. In some examples, ultra-wideband or other low power, high bandwidth communication protocol that enables precise location tracking, particularly in indoor locations, may be used to detect and capture data associated with the detected device.

A device identifier may be extracted and additional data associated with the device may be retrieved. Data associated with the current visit may be captured (e.g., position data as the device moves throughout the location, contextual data such as time of day, day of week, and the like) and analyzed. In some examples, analyzing the data may include comparing current data to previous data or previous data patterns to detect one or more anomalies. In some examples, a risk score may be determined based on evaluating a plurality of risk factors. The risk score may be compared to one or more thresholds and one or more mitigating actions may be identified and executed.

These and various other arrangements will be discussed more fully below.

Figure 1A:
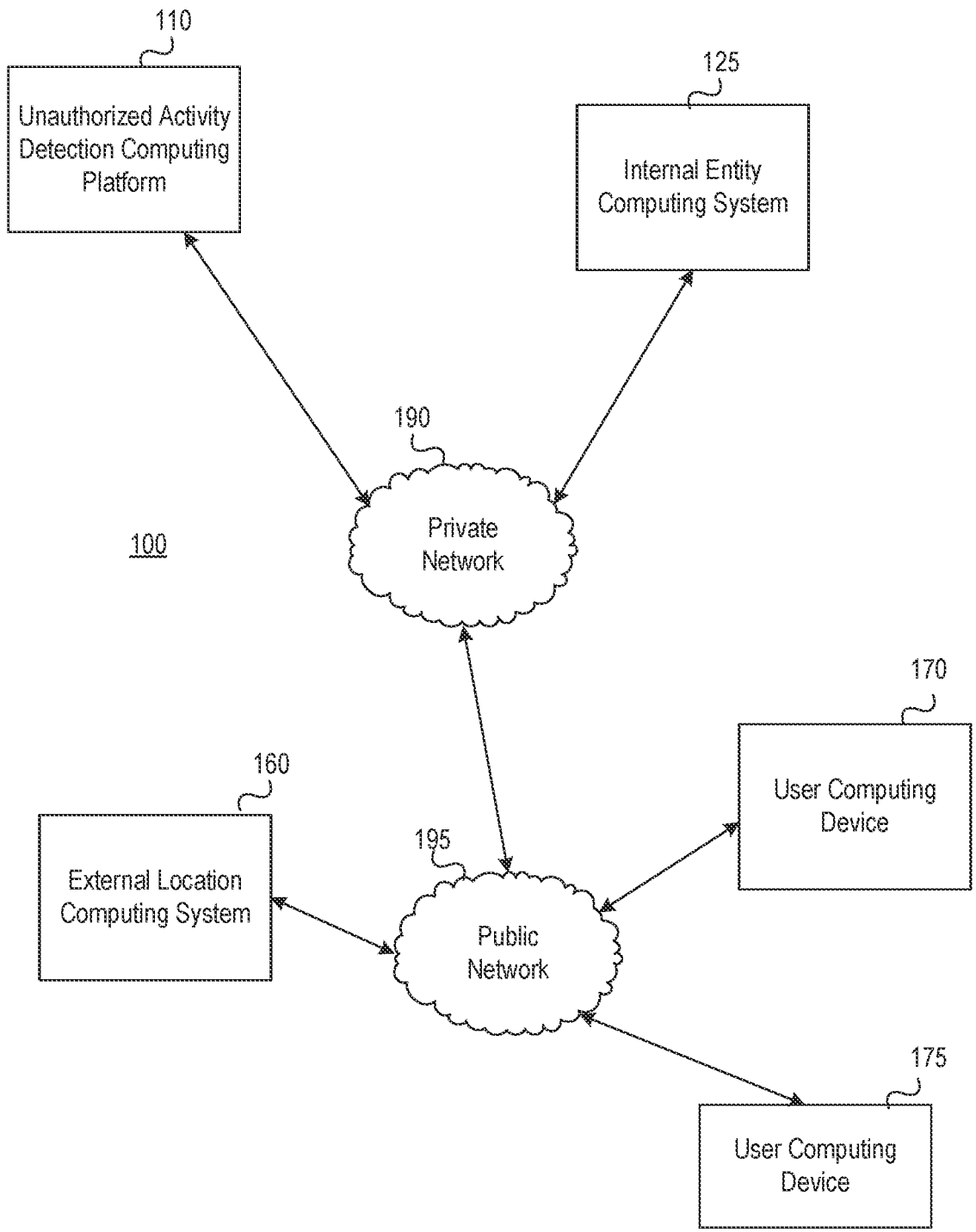
FIGS. 1A and 1B depict an illustrative computing environment for implementing unauthorized activity detection functions in accordance with one or more aspects described herein.
Figure 1B:
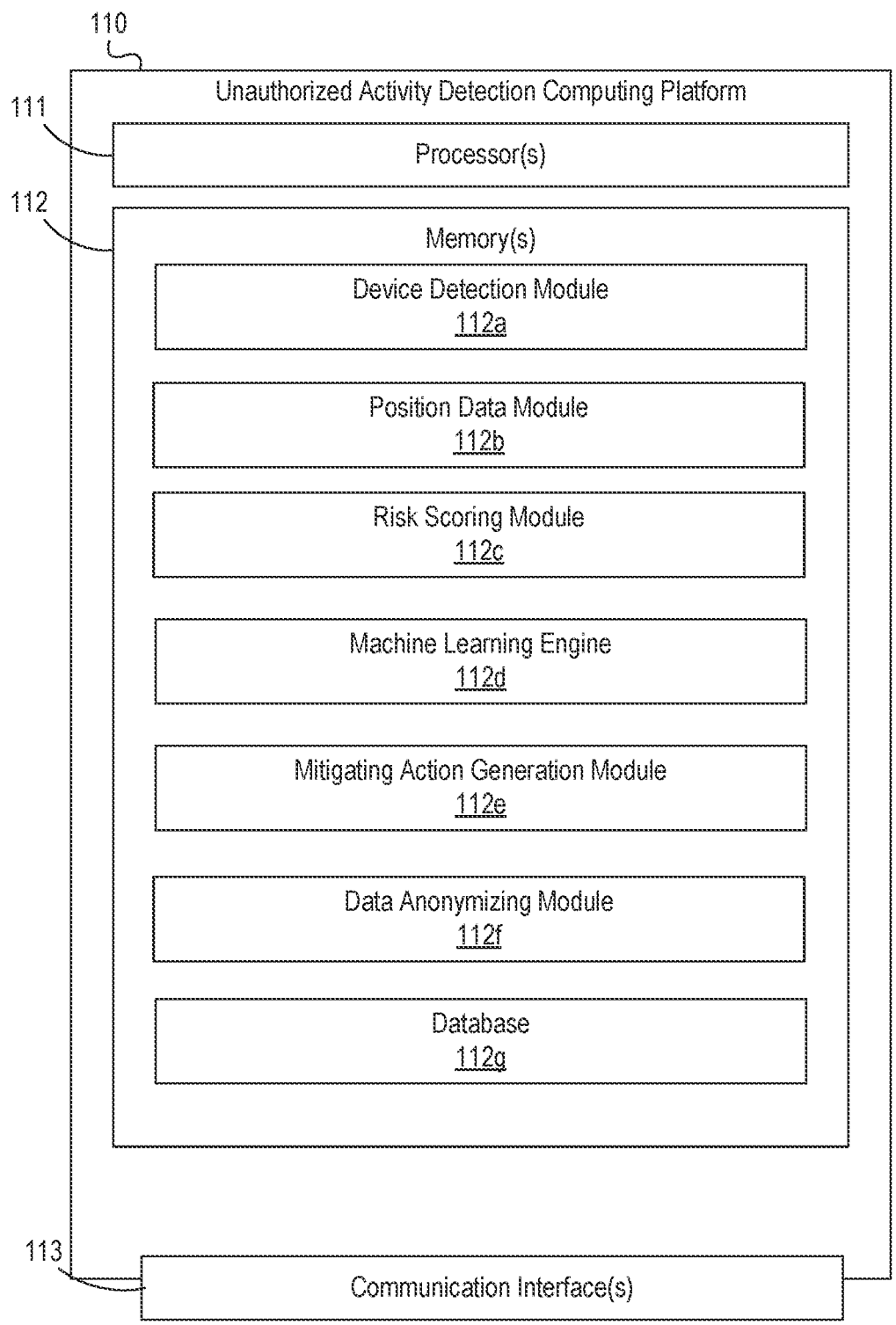

FIGS. 1A-1B depict an illustrative computing environment for implementing and using spatially aware devices to detect unauthorized activity in accordance with one or more aspects described herein. Referring to FIG. 1A, computing environment 100 may include one or more computing devices and/or other computing systems. For example, computing environment 100 may include unauthorized activity detection computing platform 110, internal entity computing system 125, external location computing system 160, user computing device 170 and user computing device 175. Although one internal entity computing systems 125, one external location computing system 160 and two user computing devices 170, 175 are shown, any number of systems or devices may be used without departing from the invention. Further, user computing device 170 and user computing device 175 may be two devices associated with a same user or associated with different users.

Unauthorized activity detection computing platform 110 may be configured to perform intelligent, dynamic and efficient evaluation of data from spatially aware devices to detect potential unauthorized activity, as described more fully herein. For instance, unauthorized activity detection computing platform 110 may receive an indication that a device, such as a spatially aware device or device having a spatially aware chip associated therewith, has been detected at a location. In some examples, the location may be associated with or internal to the enterprise organization implementing the unauthorized activity detection computing platform 110 (e.g., a branch of a financial institution) or may be external to the enterprise organization (e.g., a retail location of an entity). An identifier associated with the spatially aware chip and/or device may be extracted and stored in, for instance, a database. If the spatially aware chip and/or device was previously detected, additional data associated with this visit to the location may be stored with the data captured and stored from previous visits.

Additional data captured and stored may include position data. Position data associated with the spatially aware device may be captured as the user moves throughout the location with the device. The unauthorized activity detection computing platform may store this position data, device data, and the like. In some examples, additional data may be stored. For instance, time of day, day of week, actions taken, location of device upon login to an application associated with the enterprise organization, geo-location data from a global positioning system (GPS) of the device, and the like, may be captured and stored.

In some examples, upon detecting a device, the unauthorized activity detection computing platform 110 may receive data related to another device associated with the user (e.g., a scan of an area around the first device detected may detect a second device associated with the user, within a predefined distance of the first device, or the like). If additional devices are detected, a device fingerprint (e.g., an association of digital signatures associated with all devices of the user) may be stored and associated with the user (e.g., multiple devices may be stored in association with a particular user or user associated with one or more of the devices).

In some examples, the device may be detected each time a user visits the location and position and/or other data may be captured and stored. Accordingly, historical data associated with device movement, time, day, length of stay, geo-location data, and the like, may be stored. In some examples, this data may be stored in a public, private or public-private blockchain. In some examples, data may be anonymized to provide only anonymous device data without user identifying data.

Accordingly, during each visit in which the device and/or spatially aware chip is detected at the location, contextual data, position data, and the like, may be captured in real-time and analyzed in real-time to determine a risk score associated with the device, the device for this visit, the device for this location, or the like.

For instance, upon detecting an identifier associated with a spatially aware device, if the device was previously detected, historical data may be retrieved and evaluated to determine whether unauthorized activity was suspected or occurred during a previous visit. If so, the device may be associated with a high risk score.

In some examples, various factors associated with the device and/or the visit may be scored individually and summed to determine an overall risk score. For instance, factors such as anomalies or patterns of movement at the locations (e.g., does path through the location differ, did the user move to a different position within the location than expected, or the like), typical day and time of visit to this location, movement within the location, registered address vs. current geo-location data, speed of movement of the device (e.g., average speed of movement within the space vs. current speed of movement), differences in voice patterns between historical data and current voice patters, and/or any other difference between historical data and current data.

In some examples, the risk score (e.g., overall risk score based on all factors) may indicate a likelihood that unauthorized activity is occurring or may occur. For instance, a low risk score may indicate that the device is following patterns previously established during one or more other visits to the location (e.g., arriving at a similar time of day, on a same day of the week, staying for a same length of time, visiting areas of the location that follow historical patterns, and the like). This low risk score may indicate that there is a low likelihood of unauthorized activity occurring during this visit by a user associated with the device.

Alternatively, if a high risk score is determined (e.g., based on arrival at an unusual time of day or day of week, staying for longer than normal at the location, moving through the location in unusual ways, being at a location that is geographically distant from an expected location, using a card at an automated teller machine not associated with a name associated with the device, or the like), that may indicate a high likelihood of unauthorized activity. In some examples, the risk score may be compared to one or more thresholds and one or more mitigating actions, alerts, and/or notifications may be generated and transmitted.

In some examples, unauthorized activity detection computing platform 110 may further anonymize the captured data and share the anonymized data with one or more other entities. For instance, user identifying data, and the like may be removed from the data and the remaining data (e.g., calculated risk score, device identifier, or the like) may be shared in a public or semi-public distributed ledger, such as a blockchain.

Computing environment 100 may further include internal entity computing system 125. Internal entity computing system 125 may be systems internal to or associated with the enterprise organization implementing the unauthorized activity detection computing platform 110 and may include one or more computing devices arranged at various enterprise locations that may be configured to detect one or more spatially aware devices. For instance, internal entity computing system 125 may emit a signal that may be detected by spatially aware devices when in proximity to the internal entity computing system 125. In another example, internal entity computing system 125 may scan for and detect signals emitted from one or more spatially aware devices when within range of the computing system 125. In some examples, internal entity computing system 125 may capture position data of the one or more devices within the location (e.g., using ultra-wideband or other communication technology providing precise location data) and/or transmit the data for storage and/or analysis.

As mentioned above, more than one internal entity computing system 125 may be used without departing from the invention. In some examples, multiple internal entity computing systems 125 may be arranged within a location (e.g., a branch of a financial institution, a retail location, or the like).

External location computing system 160 may be a system or device external to (e.g., not owned by or associated with the enterprise organization). For instance, external location computing system 160 may be a computing system or device associated with a retail location of an entity (e.g., external to the enterprise organization). External location computing system 160 may be configured to detect one or more spatially aware devices, capture and transmit location data (e.g., using ultra-wideband or other communication technology providing precise location data), and the like.

User computing device 170 and/or user computing device 175 may be one or more spatially aware devices or devices including a spatially aware chip, such as a smartphone, smart watch or other wearable device, or the like. User computing device 170 and user computing device 175 may be associated with a same user or different users. In some examples, user computing device 170 and/or user computing device 175 may be configured to send and receive data via ultra-wideband or other low power communication method that enables precise location tracking (e.g., indoor space location tracking).

As mentioned above, computing environment 100 also may include one or more networks, which may interconnect one or more of unauthorized activity detection computing platform 110, internal entity computing system 125, external location computing system 160, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, unauthorized activity detection computing platform 110 and internal entity computing system 125, may be associated with an enterprise organization (e.g., a financial institution), and private network 190 may be associated with and/or operated by the organization, and may include one or more networks (e.g., LANs, WANs, virtual private networks (VPNs), or the like) that interconnect unauthorized activity detection computing platform 110 and internal entity computing system 125 and one or more other computing devices and/or computer systems that are used by, operated by, and/or otherwise associated with the organization. Public network 195 may connect private network 190 and/or one or more computing devices connected thereto (e.g., unauthorized activity detection computing platform 110, internal entity computing system 125) with one or more networks and/or computing devices that are not associated with the organization. For example, external location computing system 160, user computing device 170 and/or user computing device 175, might not be associated with an organization that operates private network 190 (e.g., because external location computing system 160, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the Internet) that connect external location computing system 160, user computing device 170 and/or user computing device 175 to private network 190 and/or one or more computing devices connected thereto (e.g., unauthorized activity detection computing platform 110, internal entity computing system 125).

Referring to FIG. 1B, unauthorized activity detection computing platform 110 may include one or more processors 111, memory 112, and communication interface 113. A data bus may interconnect processor(s) 111, memory 112, and communication interface 113. Communication interface 113 may be a network interface configured to support communication between unauthorized activity detection computing platform 110 and one or more networks (e.g., private network 190, public network 195, or the like). Memory 112 may include one or more program modules having instructions that when executed by processor(s) 111 cause unauthorized activity detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of unauthorized activity detection computing platform 110 and/or by different computing devices that may form and/or otherwise make up unauthorized activity detection computing platform 110.

For example, memory 112 may have, store and/or include device detection module 112a. Device detection module 112a may store instructions and/or data that may cause or enable the unauthorized activity detection computing platform 110 to detect or receive an indication of a detected device, determine whether the device was previously detected, previously detected at a current location, and the like. For instance, an identifier of a detected device or spatially aware chip within the device may be compared to previously stored device identifiers (e.g., in database 112g, or the like) to determine whether the device was previously detected and a location at which the device was previously detected. In some examples, upon detecting a device or receiving an indication of detection, historical data associated with previous detections may be retrieved (e.g., from database 112g) and additional contextual data may be captured or received (e.g. geo-location data, current day of week, current time of day, position data within the location, and the like).

Unauthorized activity detection computing platform 110 may further have, store and/or include position data module 112b. Position data module 112b may store instructions and/or data that may cause or enable the unauthorized activity detection computing platform 110 to receive position data, store position data, and the like. In some examples, position data module 112b may store patterns or sequences of position data associated with a user or user device.

Position data module 112*b* may receive position data captured from one or more spatially aware devices via, for instance, ultra-wideband communication to enable precise location tracking of the device in, for instance, indoor locations.

Unauthorized activity detection computing platform 110 may further have, store and/or include risk scoring module 112*c*. Risk scoring module 112*c* may store instructions and/or data that may cause or enable the unauthorized activity detection computing platform 110 to evaluate risk associated with a device, a visit associated with a device, or the like. For instance, data associated with a visit to a location (e.g., device identifying data, position data, time, date, day of week, current geo-location data of the device, speed of movement of the device, and the like) may be received by the risk scoring module and one or more risk scoring factors may be evaluated (e.g., data may be compared to expected data to determine a score for each factor). In some examples, an overall risk score may be determined by, for instance, summing each risk factor score. The risk score may be compared to one or more thresholds to determine mitigating actions to identify/implement, alerts to generate, notifications to generate, and the like.

While various aspects described herein are directed to comparing an overall risk score to one or more thresholds, in some examples, each factor that is scored may be compared to one or more factor-specific thresholds. Accordingly, if an overall risk score may fall into a first tier, but one particular factor, or category of factor, has a score in a second, higher tier, additional mitigating actions may be identified based on the higher score for the factor-specific evaluation.

In some examples, machine learning may be used to evaluate risk, predict likely movement of the user, and the like. For instance, machine learning engine 112*d* may train, execute, update and/or validate a machine learning model. Previously received data related to risk, unauthorized activity, patterns of movement in a location, and the like, may be used to train the machine learning model (e.g., via supervised learning, unsupervised learning, or the like). For instance, the machine learning model may be trained using labelled data which may, e.g., include historical data corresponding to unauthorized activity, patterns of movement within a location, speed of movement of a device, time of day, day of week, historical risk scores, and the like. Current data associated with a detected device and visit may be analyzed using the machine learning model to detect one or more anomalies in the actions, movement, or the like, of the device and/or user associated therewith.

Various machine learning algorithms may be used (e.g., by the machine learning engine 112*d* and/or the one or more machine learning models) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Unauthorized activity detection computing platform 110 may further have, store and/or include mitigating action generation module 112*e*. Mitigating action generation module 112*e* may store instructions and/or data that may cause or enable unauthorized activity detection computing platform 110 to, based on a risk score, identify one or more mitigating actions to take. For instance, if a risk score is above a threshold, a first type of mitigating action may be identified and executed (e.g., contacting law enforcement, freezing an account, or the like). If the risk score is below the threshold but above a second threshold, a second type of mitigating action may be identified and executed (e.g., contacting the user, informing local entity security, or the like). If the risk score is below the second threshold, a notification or alert may be generated and transmitted to an associate at the location. These are just some examples of mitigating actions and thresholds. Various other examples may be used without departing from the invention.

In some examples, mitigating actions may be customizable by the enterprise organization or other entity implementing the system. In some arrangements, the mitigating actions may be customizable by location (e.g., each branch of a financial institution may customize thresholds, mitigating actions, and the like). For instance, if a risk score meets a threshold for contacting security personnel, in some entity locations, they may have sufficient internal security to handle the potential unauthorized activity so they may customize mitigating actions to include contacting internal security. Alternatively, a location that does not have sufficient internal security may customize mitigating actions to contact external law enforcement if a same or similar score is identified.

Unauthorized activity detection computing platform 110 may further have, store and/or include data anonymizing module 112*f*. Data anonymizing module 112*f* may store instructions and/or data that may cause or enable the unauthorized activity detection computing platform 110 to remove any identifying information from data received (e.g., user identifying data, or the like) and store the anonymized data in a public-private blockchain. The anonymized data may, in some examples, include the identified risk score and may be transmitted to entities associated with the enterprise organization (e.g., registered entities that have requested data, or the like) for use in evaluating potential unauthorized activity. Accordingly, patterns or sequences of data may be accessed to evaluate current data to determine a likelihood of unauthorized activity.

Unauthorized activity detection computing platform 110 may further have, store and/or include a database 112*g*. Database 112*g* may store historical data, current device or user data, blockchain data, and the like.

FIGS. 2A-2G depict one example illustrative event sequence for using unauthorized activity detection functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
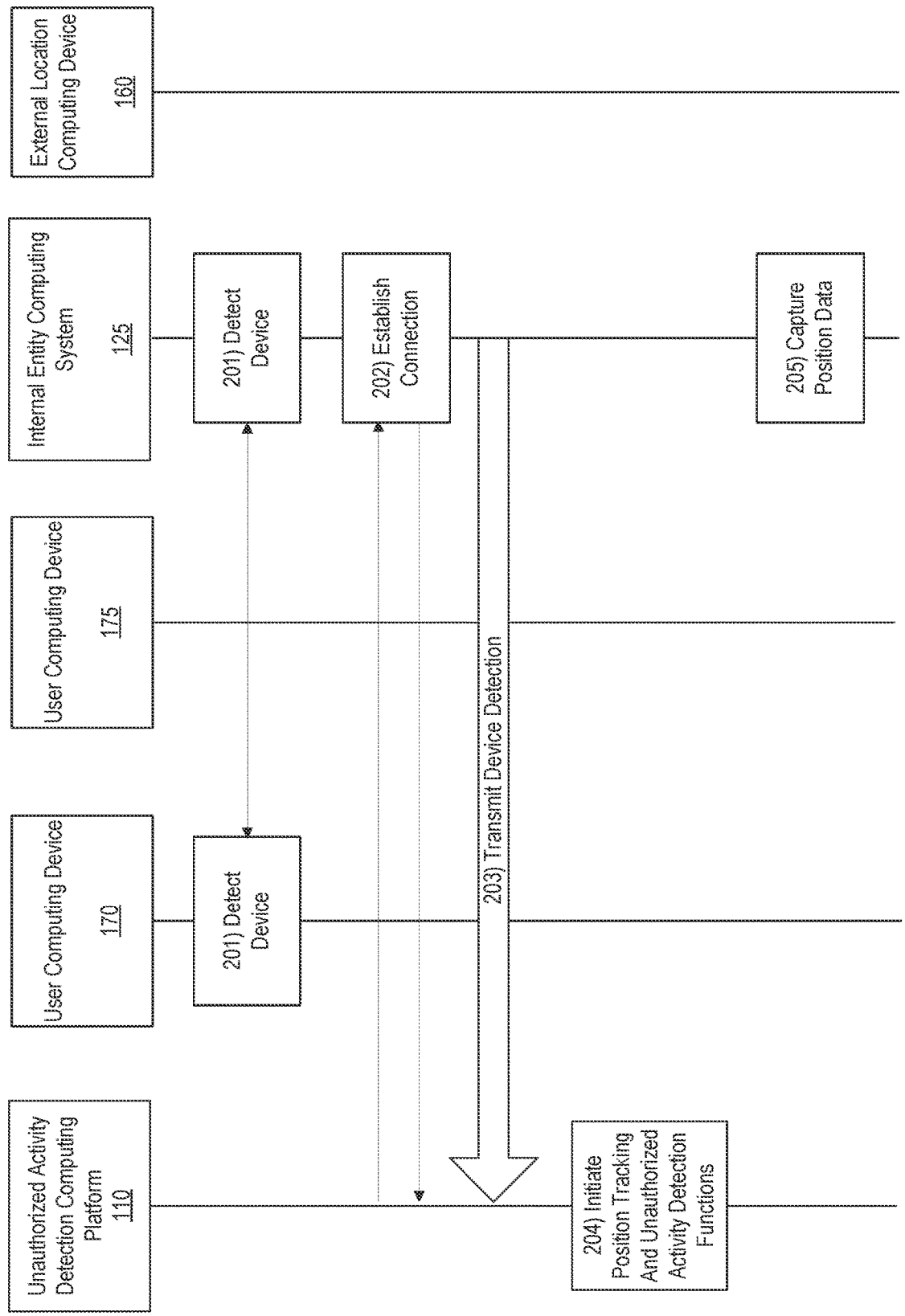

With reference to FIG. 2A, at step 201, a device, such as user computing device 170, may be detected. For instance, a user device, such as a spatially aware device or device having a spatially aware chip associated therewith (e.g., smartphone, smart watch, other wearable device, or the like) may be detected by a computing system (e.g., internal entity computing system 125) at a location. In some examples, detecting the user computing device 170 may be performed using ultra-wideband communication or other short-range, low power communication protocol configured for precise location tracking in indoor locations.

Detecting the user computing device 170 may be performed by the internal entity computing system 125 detecting a digital signal emitted by the user computing device 170 or by the user computing device 170 detecting a digital signal emitted by the internal entity computing system 125.

At step 202, internal entity computing system 125 may establish a connection with unauthorized activity detection computing platform 110. For instance, a first wireless connection may be established between the internal entity computing system 125 and the unauthorized activity detection computing platform 110. Upon establishing the first wireless connection, a communication session may be initiated between unauthorized activity detection computing platform 110 and internal entity computing system 125.

At step 203, an indication of detection of the device at the location may be transmitted by the internal entity computing system 125 to the unauthorized activity detection computing platform 110. The indication of the detection of the device 170 may include information associated with the device 170 (e.g., device identifier or the like), geo-location information, and the like.

At step 204, the device detection indication may be received by the unauthorized activity detection computing platform 110 and one or more position tracking and unauthorized activity detection functions may be initiated or activated. For instance, one or more previously inactive functions may be activated.

In some examples, initiating one or more functions may include, in response to receiving the device detection indication, determining whether the device was previously detected and/or whether the device was previously detected at the location. If not, an entry in a database may be generated including the device 170, information identifying the device, the geo-location information associated with the device, time of day, day of week, and the like. In some examples, the data may be recorded in a blockchain or other distributed ledger and a newly detected device may cause creation of a new blockchain or a new block in an existing blockchain. If the device was previously detected at a different location, a new block may be added to the blockchain associated with the device 170 indicating detection of the device at this location. Additionally or alternatively, the device detection and associated data may be stored in a database.

If the device 170 was previously detected, in some examples, historical data associated with the device may be retrieved (e.g., for comparison with current data).

In some arrangements, initiating one or more functions may include generating and transmitting one or more instructions to capture position data within a location. For instance, an instruction for a device, such as internal entity computing system 125 to capture, via, for instance UWB communication protocol, position data of the user computing device 170 as it moves throughout the location (e.g., an indoor location of the enterprise organization or other entity) may be generated and transmitted to the internal entity computing system 125 for execution.

At step 205, the internal entity computing system 125 may receive and execute the instruction and may capture position data. For instance, continuous position data may be received from the user computing device 170 or captured as the user computing device 170 moves through the location. In some examples, position data may be captured for a duration of time corresponding to a signal being detected (e.g., a signal detected within a predefined range or proximity of the location, internal entity computing system 125, or the like).

Figure 2B:
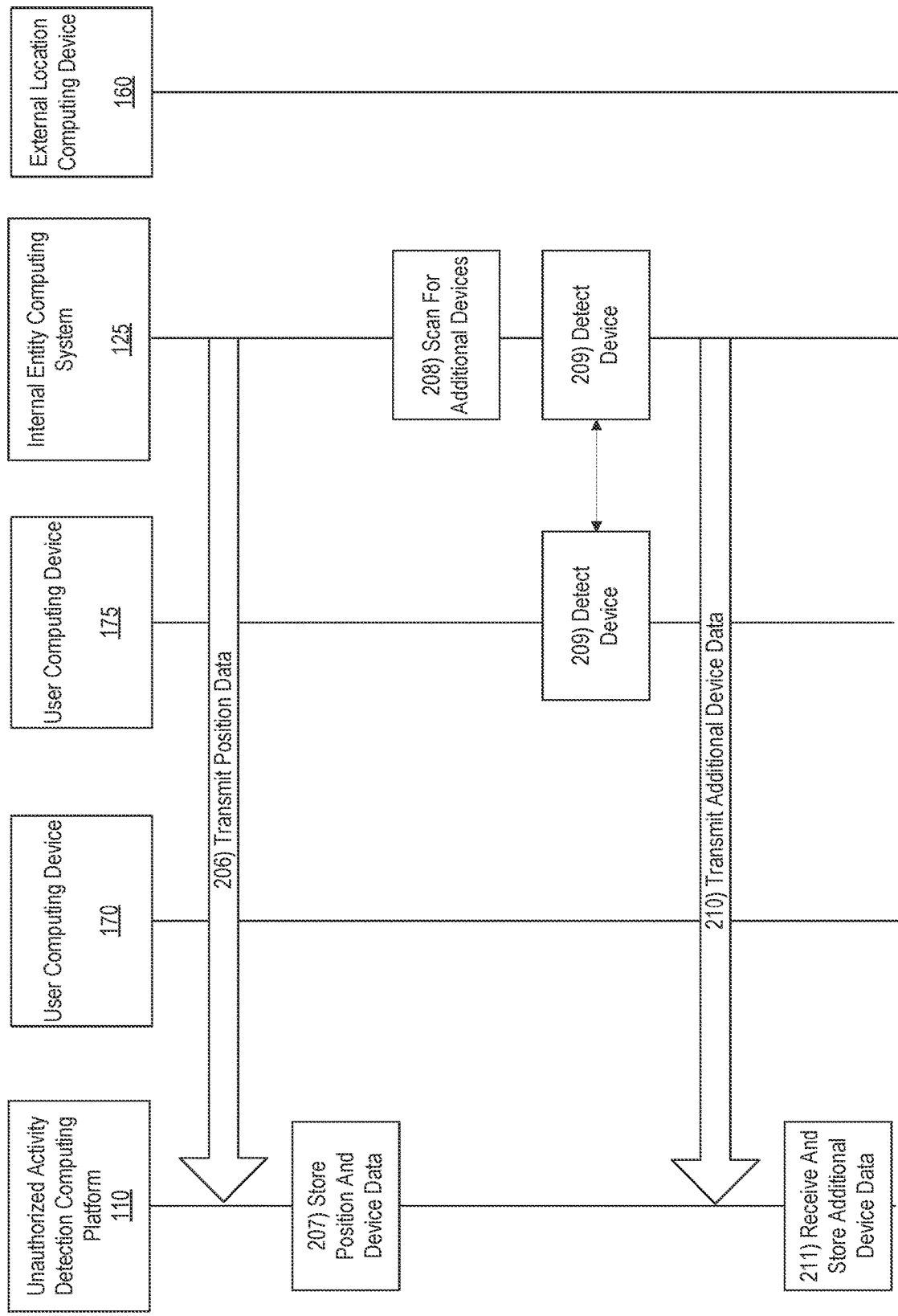

With reference to FIG. 2B, at step 206, the captured position data may be transmitted by the internal entity computing system 125 to the unauthorized activity detection computing platform 110. In some examples, the position data may be transmitted directly from the user computing device 170 to the unauthorized activity detection computing platform 110 (e.g., without transmission to the internal entity computing system 125).

At step 207, the position data may be received by unauthorized activity detection computing platform 110 and stored. In some examples, the position data may be stored in a blockchain or other distributed ledger. Additionally or alternatively, the position data may be stored in a database, such as database 112g. In some examples, the position data, as well as device data, day of week, time of day, and the like, may be used to train a machine learning model.

In some examples, a scan for additional devices may be conducted. For instance, at step 208, internal entity computing system 125 may scan an area for additional spatially aware devices or devices having spatially aware chips associated therewith, within a predefined range of the first detected device (e.g., at step 201). For instance, in addition to a smartphone, a user may wear a smart watch including a spatially aware chip. Accordingly, in scanning for additional devices that are within a predefined range of the initially detected device, additional devices associated with the user may be detected (e.g., a digital signal of the smart watch may be detected).

At step 209, an additional device may be detected. For instance, user computing device 175 may be detected within a predefined range of internal entity computing system 125 and user computing device 170.

At step 210, device data and an indication of detection may be transmitted by the internal entity computing system 125 to the unauthorized activity detection computing platform 110. The device data may include an identifier associated with user computing device 175 (or identifier of the spatially aware chip), type of device, and the like.

At step 211, the additional device data may be received and stored. For instance, the additional device data may be associated with the initially detected user computing device 170 and stored in database 112g, in a blockchain or other distributed ledger, or the like.

Figure 2C:
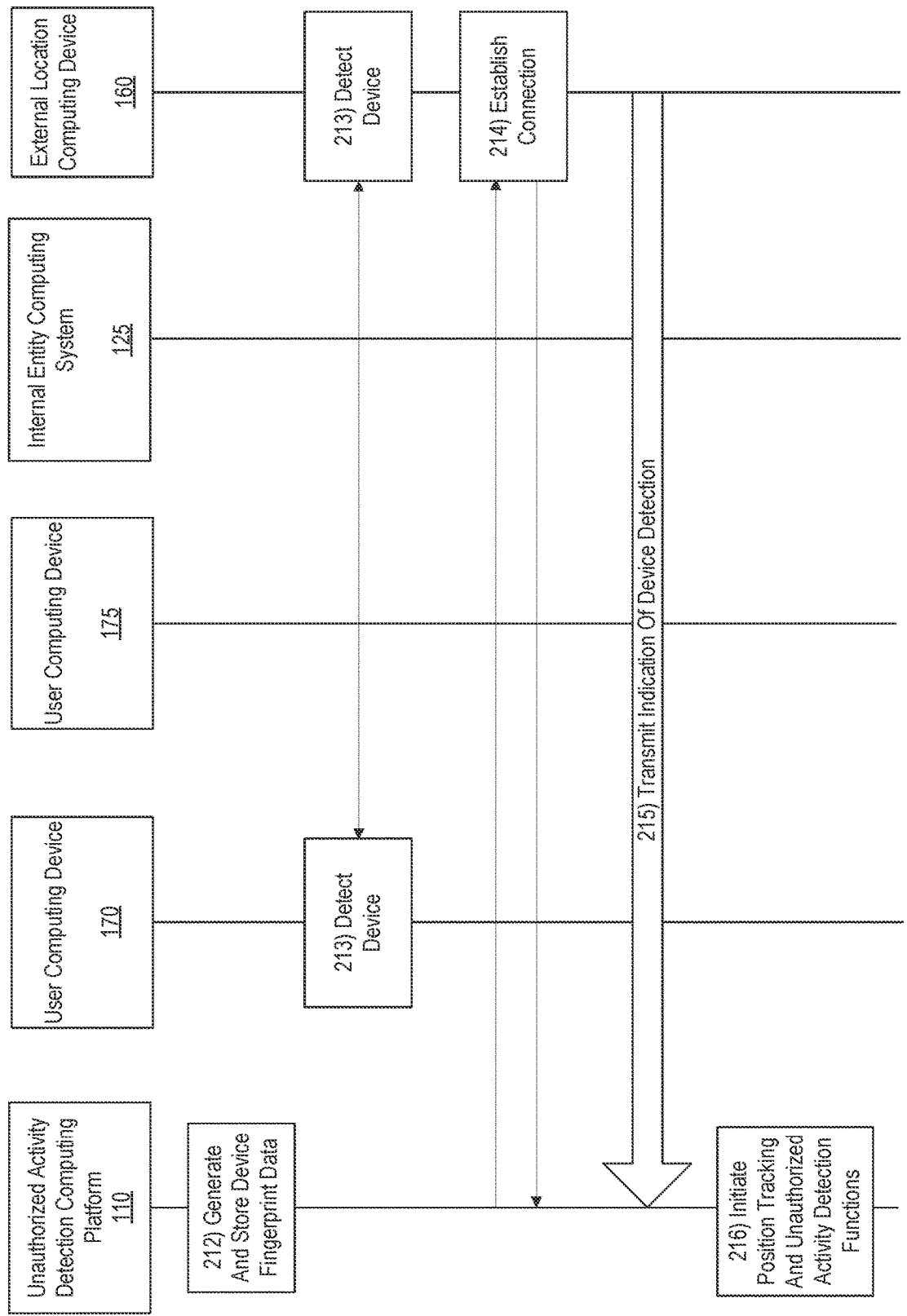

With reference to FIG. 2C, at step 212, device fingerprint data may be generated and stored by the unauthorized activity detection computing platform 110. For instance, both devices detected (e.g., user computing device 170 and user computing device 175) may be stored together as a "device fingerprint" associated with a user. Accordingly, when one or more devices are subsequently detected together, that may indicate a low likelihood of unauthorized activity because an unauthorized actor would be unlikely to have both user computing device 170 and user computing device 175.

Alternatively, if unauthorized activity is detected or was previously detected in association with the digital fingerprint, this combination of devices, or device fingerprint, may indicate a high likelihood of additional unauthorized activity and a high risk score may be generated, one or more mitigating actions may be identified, or the like. In some examples, the device fingerprint may be shared with one or more other entities as an indication of potential unauthorized activity.

In some examples, a device fingerprint might not be generated, and steps 208 to 212 may be considered optional and/or may be omitted.

Although arrangements discussed above include detection of a device by an internal computing system (e.g., at a location associated with the enterprise organization), external devices may be used to detect devices as well. Accordingly, steps 213 to 218 illustrate an external device detecting a user device.

At step 213, a device, such as user computing device 170, may be detected. For instance, a user device, such as a spatially aware device or device including a spatially aware chip (e.g., smartphone, smart watch, other wearable device, or the like) may be detected by a computing system (e.g., external location computing system 160) at a location. In some examples, detecting the user computing device 170 may be performed using ultra-wideband communication or other low power communication protocol configured for precise location tracking in indoor locations.

Detecting the user computing device 170 may be performed by the external location computing system 160 detecting a signal emitted by the user computing device 170 or by the user computing device 170 detecting a signal emitted by the external location computing system 160.

At step 214, external location computing system 160 may establish a connection with unauthorized activity detection computing platform 110. For instance, a second wireless connection may be established between the external location computing system 160 and the unauthorized activity detection computing platform 110. Upon establishing the second wireless connection, a communication session may be initiated between unauthorized activity detection computing platform 110 and external location computing system 160.

At step 215, an indication of detection of the device at the location may be transmitted by the external location computing system 160 to the unauthorized activity detection computing platform 110. The indication of the detection of the device 170 may include information associated with the device 170 (e.g., device identifier or the like), geo-location information, and the like.

At step 216, the device detection indication may be received by the unauthorized activity detection computing platform 110 and one or more position tracking and unauthorized activity detection functions may be initiated or activated. For instance, one or more previously inactive functions may be activated.

In some examples, initiating one or more functions may include, in response to receiving the device detection indication, determining whether the device was previously detected and/or whether the device was previously detected at the location. If not, an entry in a database may be generated including the device 170, information identifying the device, the geo-location information associated with the device, and the like. In some examples, the data may be recorded in a blockchain or other distributed ledger and a newly detected device may cause creation of a new blockchain or a new block in an existing blockchain. If the device was previously detected at a different location, a new block may be added to the blockchain associated with the device 170 indicating detection of the device at this location.

If the device 170 was previously detected, in some examples, historical data associated with the device may be retrieved.

In some arrangements, initiating one or more functions may include generating and transmitting one or more instructions to capture position data within a location. For instance, an instruction for a device, such as external location computing system 160 to capture position data of the user computing device 170 as it moves throughout the location (e.g., an indoor location of the entity such as a retail location) may be generated and transmitted to the external location computing system 160 for execution.

Figure 2D:
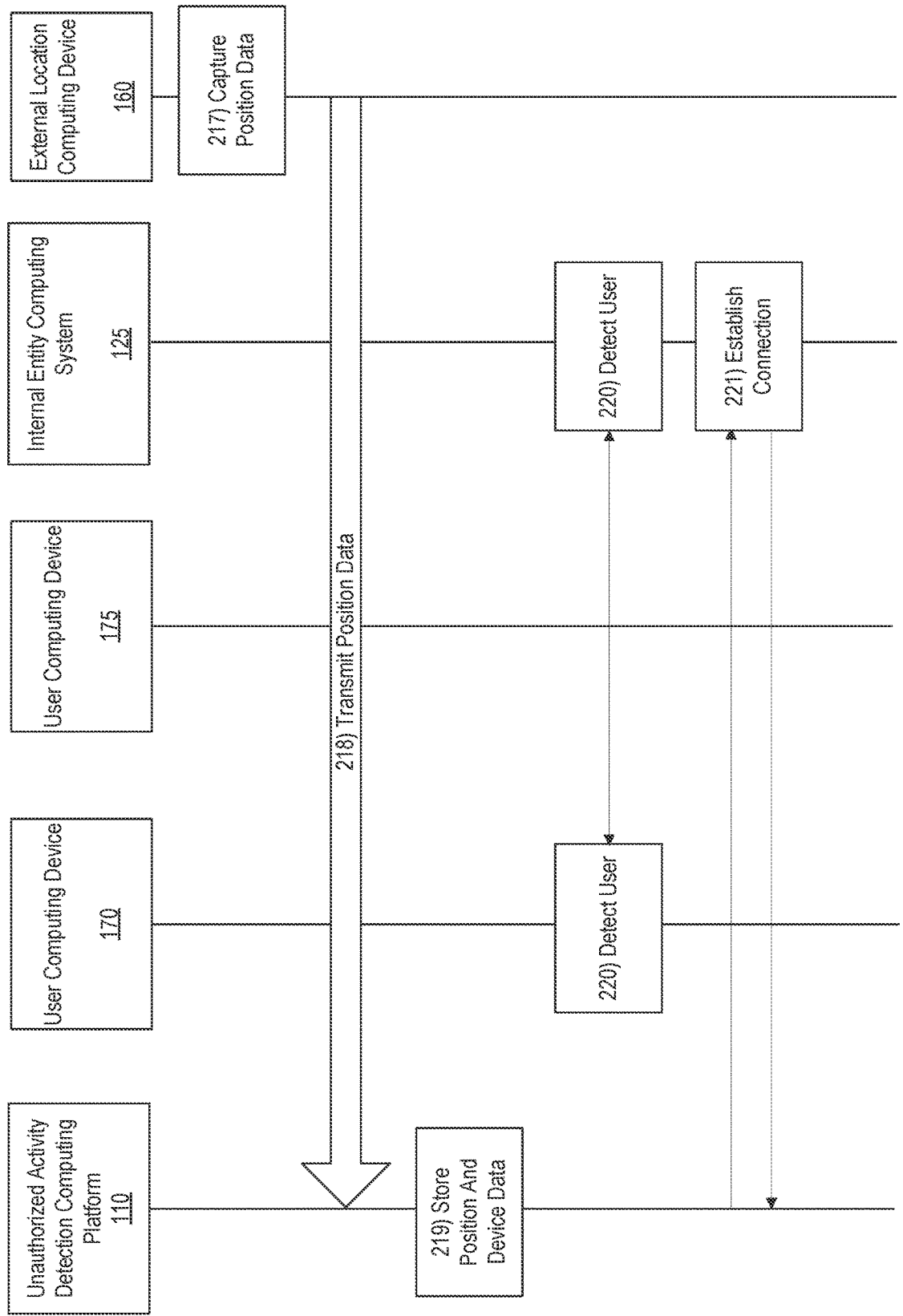

With reference to FIG. 2D, at step 217, the external location computing system 160 may receive and execute the instruction and may capture position data. For instance, continuous position data may be received from the user computing device 170 or captured as the user computing device 170 moves through the location. In some examples, position data may be captured for a duration of time corresponding to a signal being detected (e.g., a signal detected within a predefined range or proximity of the location, external location computing system 160, or the like).

At step 218, the captured position data may be transmitted by the external location computing system 160 to the unauthorized activity detection computing platform 110. In some examples, the position data may be transmitted directly from the user computing device 170 to the unauthorized activity detection computing platform 110 (e.g., without transmission to the external location computing system 160).

At step 219, the position data may be received by unauthorized activity detection computing platform 110 and stored. In some examples, the position data may be stored in a blockchain or other distributed ledger. Additionally or alternatively, the position data may be stored in a database, such as database 112g. In some examples, the position data, as well as device data, day of week, time of day, and the like, may be used to train a machine learning model.

At a subsequent time, e.g., after initial detection or previous detection of user computing device 170, the user computing device 170 may be detected at the location again. For instance, at a second time after a first time the device was detected at the location (e.g., at step 210) the user computing device 170 may be detected at the location again.

At step 221, if a connection is not already established, internal entity computing system 125 may establish a connection with unauthorized activity detection computing platform 110. For instance, a third wireless connection may be established between the internal entity computing system 125 and the unauthorized activity detection computing platform 110. Upon establishing the third wireless connection, a communication session may be initiated between unauthorized activity detection computing platform 110 and internal entity computing system 125.

Although not shown, a similar process may be performed when the user computing device 170 is detected a second time at an external location by external location computing system 160.

Figure 2E:
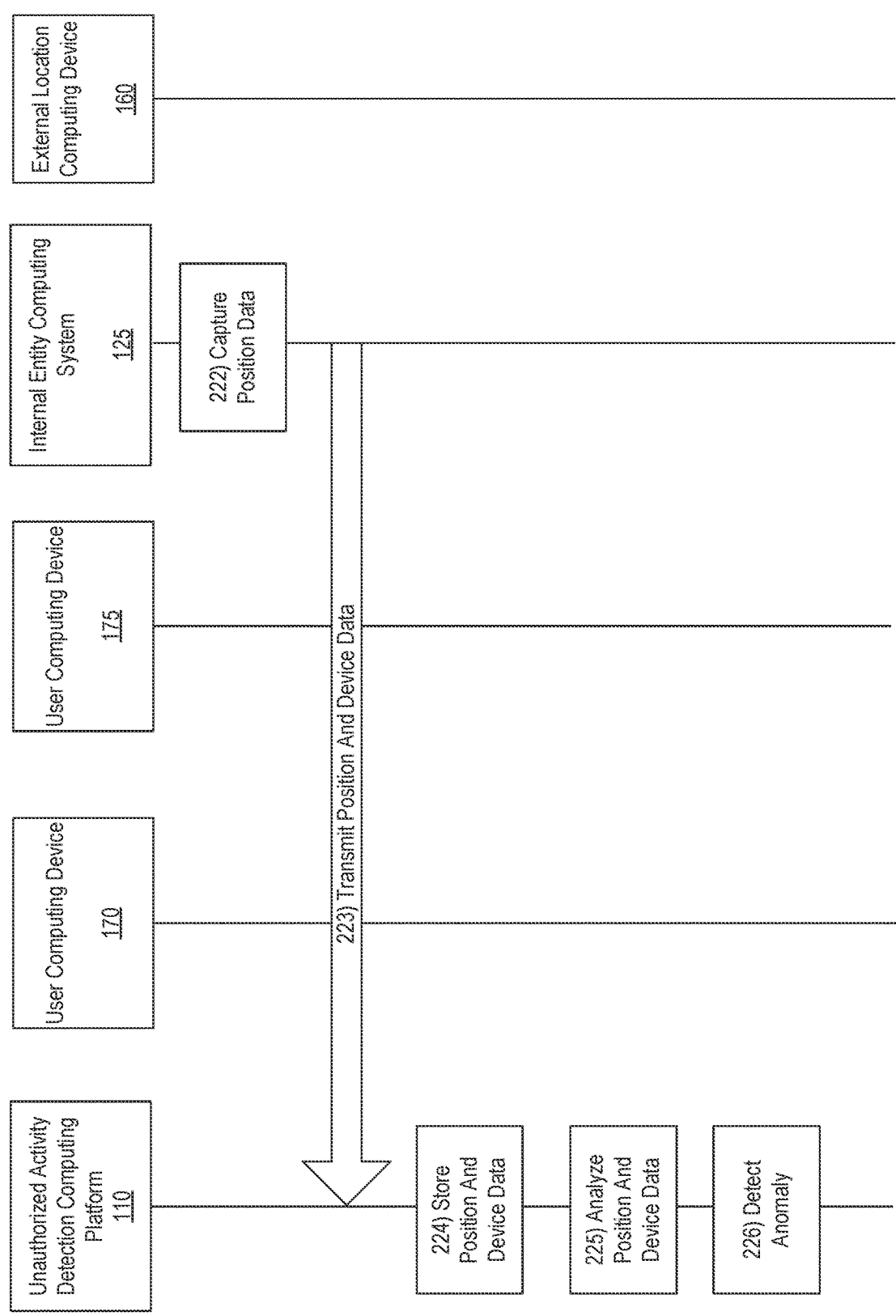

With reference to FIG. 2E, at step 222, position data may be captured. For instance, position data associated with the detected user computing device 170 may be captured as the user moves through the location during this second or subsequent visit (e.g., at a second or subsequent time). The position data may be captured via ultra-wideband communications and may be used to determine a position of a user within the location.

At step 223, the position and device data may be transmitted by the internal entity computing system 125 to the unauthorized activity detection computing platform 110. In some examples, the position and device data may include additional details such as geo-location of the device (e.g., based on global positioning system (GPS) data, device type, device identifier, and the like).

At step 224, the position and device data may be received by the unauthorized activity detection computing platform 110 and stored. In some examples, receiving the position and/or device data may include determining whether the device 170 was previously detected and, if so, retrieving pre-stored data associated with the device, one or more visits, and the like. If the device was not previously detected, a new entry in a database may be created for the device.

At step 225, the position and device data may be analyzed, for instance, in real-time, to determine a likelihood of unauthorized activity. For instance, one or more factors associated with the position and device data may be scored to determine an overall risk score associated with the device for that visit to the location. For instance, time, day of week, position data, device data, and the like, may be analyzed to determine whether it matches or corresponds to previous data or expected data. In some examples, one or more factors may each be scored for a likelihood of unauthorized activity (e.g., time of day vs. previous or expected time of day, anomaly in movement or position data, day of week vs. expected day of week, and the like may each be scored).

In some examples, a machine learning model may be used to evaluate the current contextual device data (e.g., position data, day of week, and the like) to determine whether there are one or more anomalies, to determine a score for each factor, or the like. For instance, the machine learning model may determine whether the device has been detected on an unexpected day of the week, time of day, the device moves through unexpected patterns of movement, whether geo-location data does not match expected geo-location data, and the like. If one or more anomalies are detected, the anomalies may be output and used in determining an overall risk score for the device.

At step 226, one or more anomalies may be detected. For instance, the device may be detected near a cashier for an extended period of time, which may be different from previous visits to the location. In another example, the device may be detected as going directly to an associate rather than a self-service kiosk, which is historically the pattern the device follows. Various other anomalies may be detected without departing from the invention.

Figure 2F:
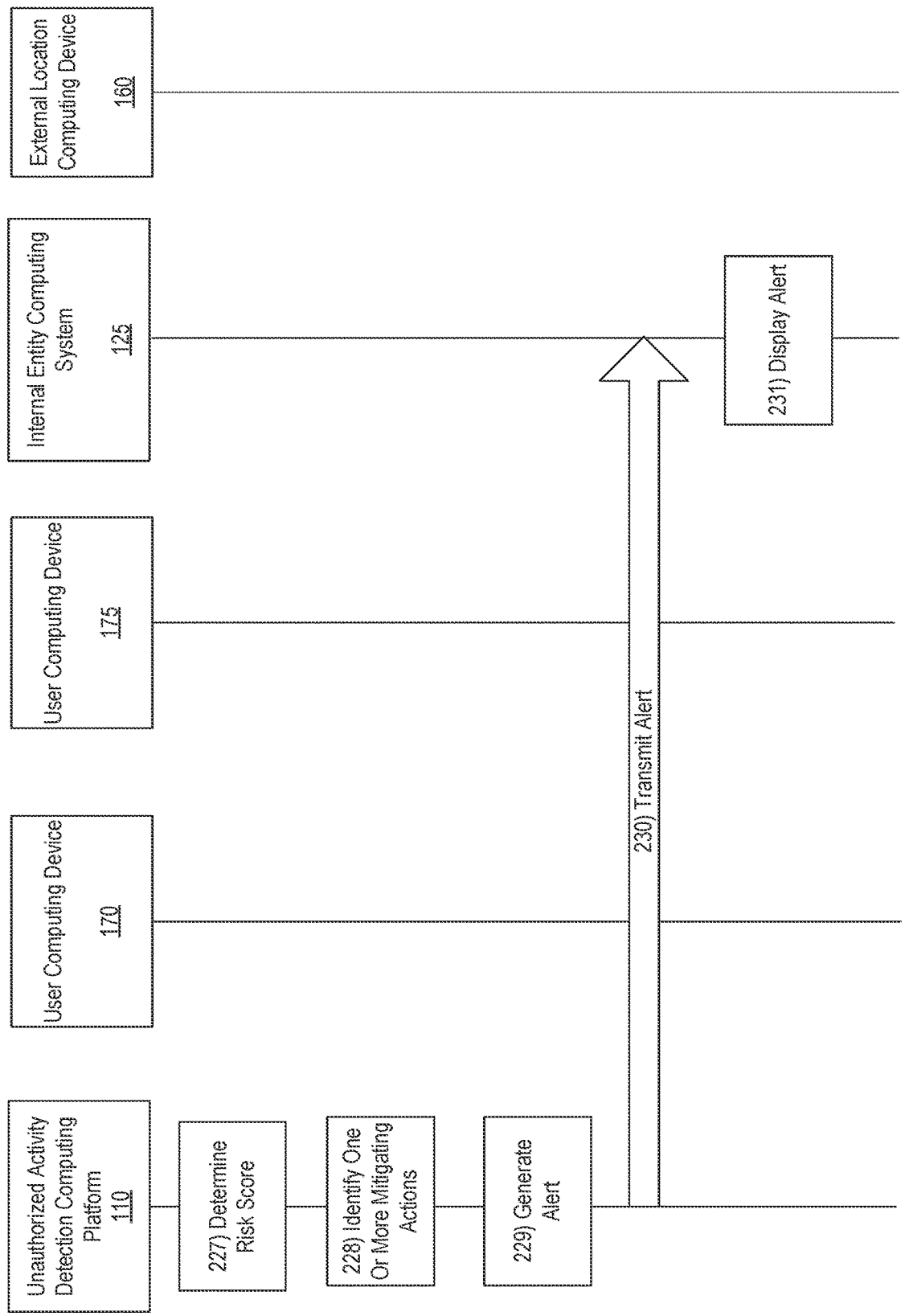

With reference to FIG. 2F, at step 227, a risk score may be determined for the device and/or for the device for that particular visit to the location. For instance, one or more factors may be scored, anomalies scored, and the like, and the scores may be summed to determine an overall risk score. In some examples, each factor may be scored on a scale of 1 to 10 and the score for each factor may be summed to determine the overall risk score. In some arrangements, the machine learning model may determine one or more of a risk score for one or more factors or the overall risk score.

At step 228, the risk score may be compared to one or more thresholds and one or more mitigating actions may be identified for execution. For instance, the risk score may be compared to one or more thresholds and, if high enough, first mitigating actions may be identified and executed (e.g., contacting law enforcement, freezing an account, or the like). If at a lower level, different mitigating actions (e.g., generating an alert or notification to the user or associate of the enterprise organization, refusing a transaction, or the like) may be identified and executed.

In some examples, the mitigating actions identified may be customizable based on enterprise organization, particular location, or the like.

Mitigating actions may include a variety of actions. For instance, for very high risk score situations, one or more mitigating actions may include contacting internal security and/or law enforcement. Additionally or alternatively, mitigating actions may include modifying authentication requirements for the user associated with the detected device (e.g., requiring multi-factor identification, biometric authentication, additional forms of identification, or the like). Further, in some arrangements, mitigating actions may include modifying systems associated with the enterprise organization. For instance, one or more additional internal processes may be performed to verify authenticity of a transaction. Accordingly, internal systems may be modified upon implementation of the one or more mitigating actions to execute the additional verification processes. Various other mitigating actions may be used without departing from the invention.

In some examples, one or more risk factors being scores may include a risk factor category. In some arrangements, the one or more mitigating actions identified and/or executed may be based on the risk factor category.

At step 229, one or more alerts may be generated. In some examples, the one or more alerts may be an only mitigating action generated (e.g., if there is low risk of unauthorized activity, an alert may be generated notifying an associate or the user of potential risk but indicating that it is not likely). Additionally or alternatively, one or more alerts may be generated indicating mitigating actions that have been executed (e.g., contacting security or law enforcement, freezing an account, or the like.

At step 230, the generated one or more alerts may be transmitted to one or more devices, such as internal entity computing system 125, user computing device 170, or the like.

At step 231, the generated one or more alerts may be displayed by a display of a device, such as internal entity computing system 125.

With reference to FIG. 2G, at step 232, unauthorized activity detection computing platform 110 may anonymize device and/or position tracking data. For instance, personal identifying information, and the like, may be removed from the data and the data (e.g., risk score, and the like) may be stored in, for instance, a blockchain or other distributed ledger (e.g., public blockchain, public-private blockchain, or the like) such that the anonymized data may be accessible to entities other than the enterprise organization. Accordingly, the anonymized data may be used by other entities to detect anomalies in patterns of data that may indicated potential unauthorized activity.

At step 233, the anonymized data may be transmitted for storage and/or transmitted to one or more computing systems or devices. For instance, the anonymized data may be transmitted to one or more entities computing systems external to the enterprise organization.

Figure 3:
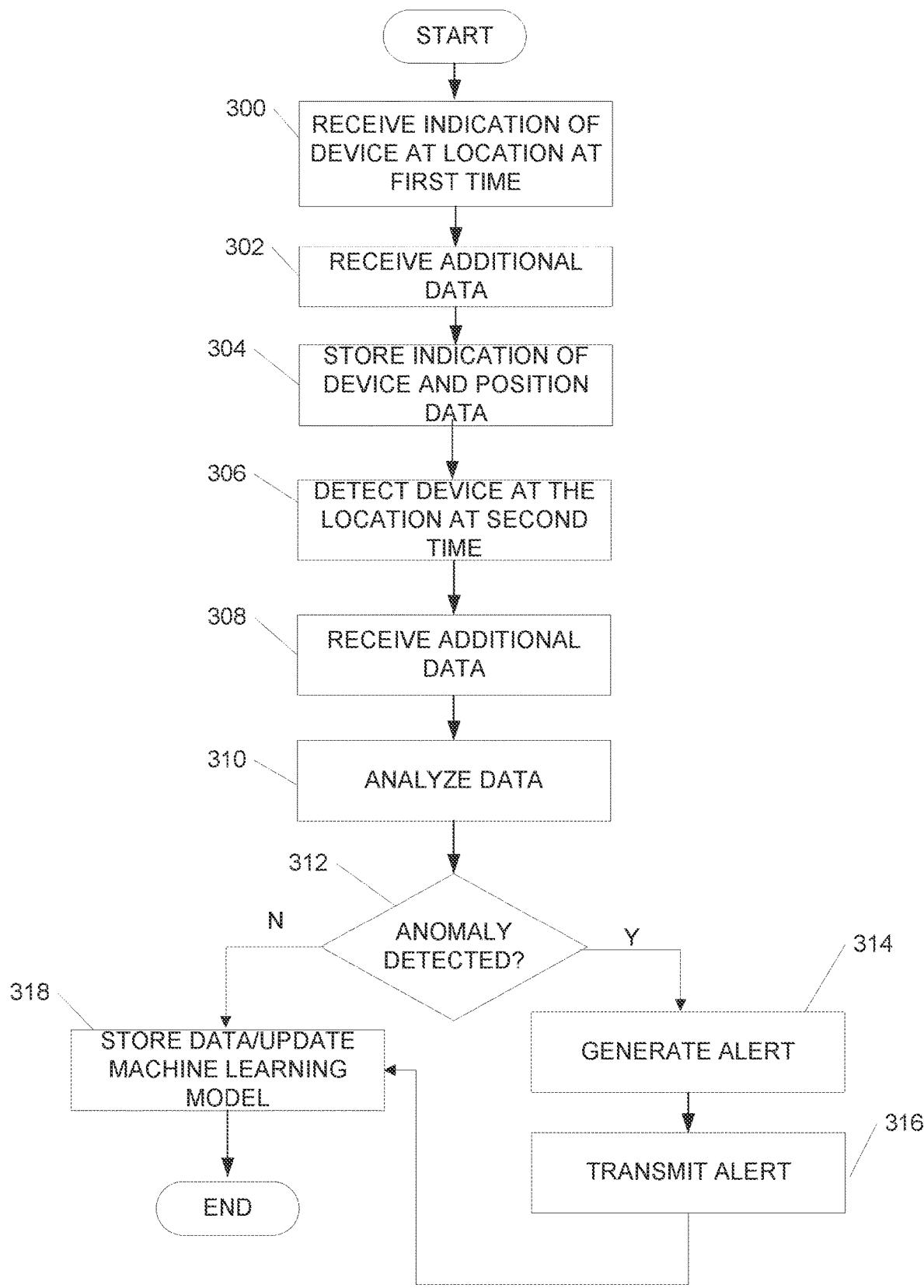
FIG. 3 illustrates an illustrative method for implementing unauthorized activity detection functions according to one or more aspects described herein.

FIG. 3 is a flow chart illustrating one example method of implementing unauthorized activity detection functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, an indication of a device at a location at a first time (e.g., on a first visit to the location) may be received. For instance, a spatially aware device, such as user computing device 170 having a spatially aware chip, may be detected at a location at a first time. In some examples, the device indication may include a device identifier, device type, or other information associated with the device.

Responsive to detecting the device, at step 302, additional data associated with the device may be captured and/or received by the unauthorized activity detection computing platform 110. For instance, position data captured via ultra-wide band or other low energy communication system that includes precise tracking, particularly in indoor locations, may be captured as the device (e.g., via a user associated with the device) moves throughout the location. In addition, contextual data such as time of day, day or week, geo-location data, and the like, may be received.

At step 304, the device indication and additional data may be stored. For instance, the device and/or additional data may be stored in a database, distributed ledger, or the like.

At step 306, the device, such as user computing device 170 including the spatially aware chip, may be detected at the location at a second time (e.g., during a second visit occurring after the first visit). An indication of the device detection may be received.

Responsive to receiving the device detection at the second time, second additional data associated with the device may be captured and received at step 308. For instance, position data as the device moves throughout the location during the second visit may be received. Further, contextual data associated with the second visit may be received.

At step 310, the additional data and/or device data (e.g., from the second visit) may be analyzed. In some examples, first additional data associated with the first visit may be retrieved and compared to second additional data from the second visit. In some examples, the data may be analyzed using a machine learning model trained on historical data linking one or more patterns of movement or contextual data to unauthorized activity. The machine learning model may receive, as inputs, the device data and/or position data and may generate an output indicating whether an anomaly is present, whether unauthorized activity is detected, and the like.

At step 312, a determination may be made as to whether an anomaly has been detected (e.g., position data does not match an expected pattern, or the like). The anomaly may indicate unauthorized activity or potential unauthorized activity.

If, at step 312, an anomaly is detected, one or more alerts may be generated. The alerts may indicate that an anomaly has been detected and one or more mitigating actions that may have been identified. At step 316, the generated one or more alerts may be transmitted to one or more computing devices or systems.

If, at step 312, an anomaly is not detected, or after detecting an anomaly, generating and transmitting one or more alerts, and the like, the position data and/or device data may be used to update and/or validate the machine learning model and may be stored (e.g., in database, distributed ledger, or the like). In some examples, feedback data may be received in response to the alert (e.g., acknowledgement, dismissal if there is no issue, escalation if an issue is detected, or the like). This feedback data may be used to update and/or validate the machine learning model to provide continuously improving accuracy.

Aspects described herein are related to using spatially aware devices to detect unauthorized activity or potential unauthorized activity. By storing data associated with a device identifier, subsequent data may be compared to previously captured and stored data to identify differences in data, unexpected occurrences in data, and the like. In some examples, a risk score may be generated based on one or more risk factors. The risk score may be compared to one or more thresholds to determine one or more mitigating actions that may, in some examples, be automatically executed or implemented.

One example of detecting unauthorized activity based on spatially aware devices is provided below. The example is merely one example scenario and other scenarios may be used without departing from the invention.

Individual 1 may enter a branch location of a financial center. A spatially aware device associated with individual 1 may be detected and data may be captured. For instance, a smart watch being worn by individual 1 may be detected and an identifier of the smart watch may be analyzed to determine whether it was previously stored. In this example, the identifies and associated data was previously stored and a risk score of individual 1 of 3.5 out of 10 is retrieved. Individual 1 then approaches a self-service kiosk and inserts a card to initiate a transaction. The card is associated with Individual 2.

Continuing the example, data for individual 2 is retrieved based on the initiation of the transaction via the card. Individual 2 has a home address in a different geo-location than the detected smart watch worn by individual 1 and the location of the branch. There has not been detection of a device associated with individual 2 at this geolocation for the past several weeks.

The risk score associated with individual 1 is updated to 6.5 out of 10 based on using the unauthorized card at the self-service kiosk. Security is notified within the branch but individual 1 is able to complete the transaction and leave before being asked for additional authentication data. Anonymized data associated with the smart watch and including the updated risk score is shared with other local financial institutions.

Accordingly, individual 1 then immediately proceeds to a branch location of a second financial institution (e.g., one who received the shared anonymized data). Immediately upon detecting the smart watch including the spatially aware device, security is alerted to the high risk score detection and the individual leaves the branch without conducting a transaction. The risk score is then modified to 8 out of 10.

Later that week, individual 1 goes to a grocery store to shop for food. The grocery store detects the smart watch and receives an alert that a high risk detection has occurred. Accordingly, law enforcement is notified and individual 1 may be apprehended.

Another example of detecting unauthorized activity using spatially aware devices is provided below. The example below is merely one scenario and additional scenarios may be used without departing from the invention.

Individual 1 enters a branch of a financial institution and that person's smart phone including a spatially aware device is detected. An identifier of the smart phone is extracted and data may be retrieved. Individual 1 has an initial risk score of 1 out of 10. Individual 1 proceeds to withdraw money from a self-service kiosk using a card belonging to individual 2.

Based on using the card associated with individual 2, additional data is retrieved and analyzed. Individual 2 lives in another county but individual 1 has accessed online banking accounts associated with individual 2 previously. The risk score for individual 1 is updated to 4 out of 10.

Upon a subsequent visit to the branch, individual 1 and individual 2 arrive together. Additional authentication and verification is requested based on the detected previous use of the card of individual 2. The two individuals are related and the use is authorized. Accordingly, the risk score may be reduced to 1 out of 10 and the relationship between parties is noted so that further use of the card will not trigger increased risk scores.

Figure 4:
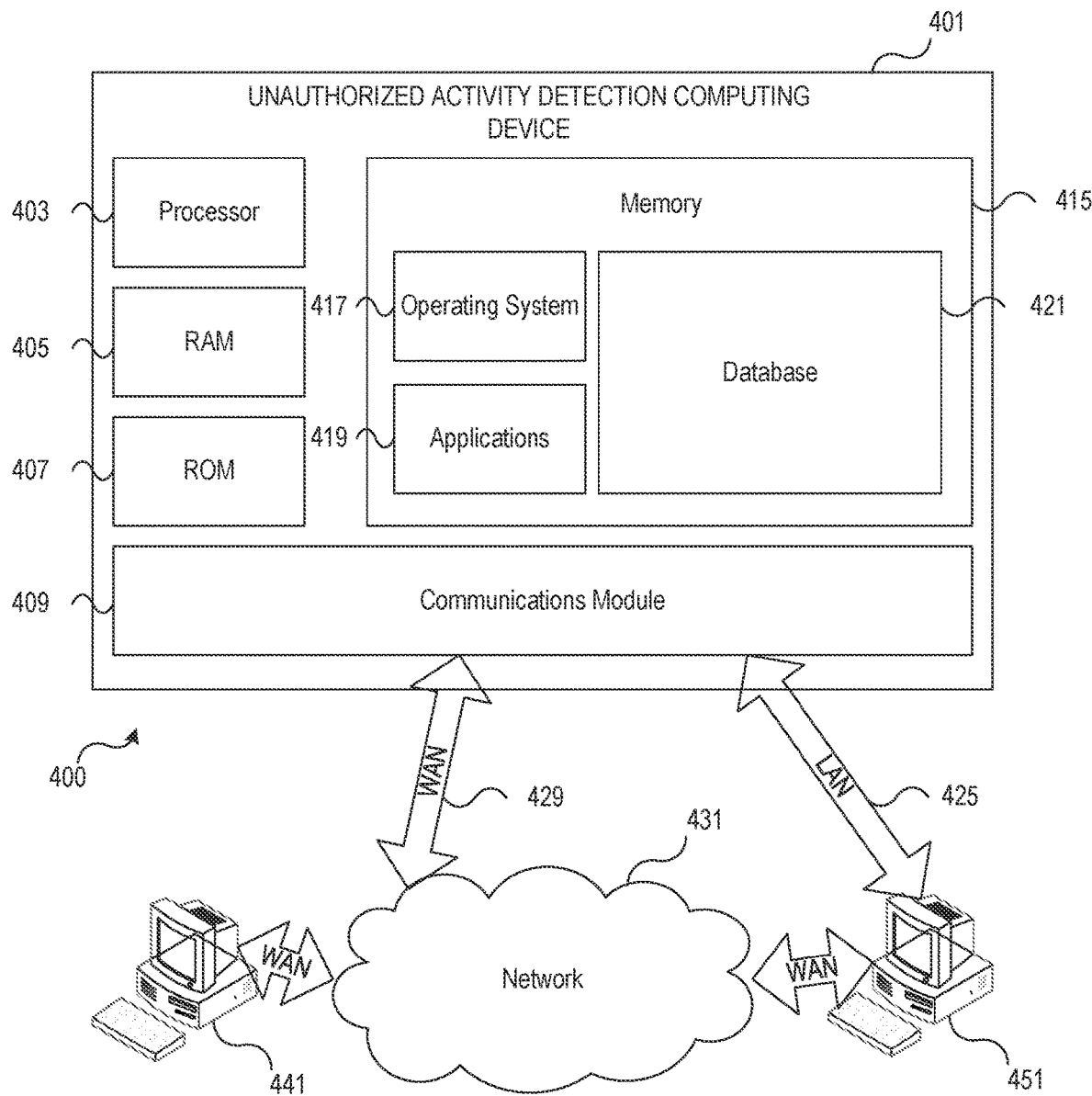
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include unauthorized activity detection computing device 401 having processor 403 for controlling overall operation of unauthorized activity detection computing device 401 and its associated components, including Random Access Memory (RAM) 405, Read-Only Memory (ROM) 407, communications module 409, and memory 415. Unauthorized activity detection computing device 401 may include a variety of computer readable media. Computer readable media may be any available media that may be accessed by unauthorized activity detection computing device 401, may be non-transitory, and may include volatile and nonvolatile, removable, and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by unauthorized activity detection computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on unauthorized activity detection computing device 401. Such a processor may execute computer-executable instructions stored on a computer-readable medium.

Software may be stored within memory 415 and/or storage to provide instructions to processor 403 for enabling unauthorized activity detection computing device 401 to perform various functions as discussed herein. For example, memory 415 may store software used by unauthorized activity detection computing device 401, such as operating system 417, application programs 419, and associated database 421. Also, some or all of the computer executable instructions for unauthorized activity detection computing device 401 may be embodied in hardware or firmware. Although not shown, RAM 405 may include one or more applications representing the application data stored in RAM 405 while unauthorized activity detection computing device 401 is on and corresponding software applications (e.g., software tasks) are running on unauthorized activity detection computing device 401.

Communications module 409 may include a microphone, keypad, touch screen, and/or stylus through which a user of unauthorized activity detection computing device 401 may provide input, and may also include one or more of a speaker for providing audio output and a video display device for providing textual, audiovisual and/or graphical output. Computing system environment 400 may also include optical scanners (not shown).

Unauthorized activity detection computing device 401 may operate in a networked environment supporting connections to one or more remote computing devices, such as computing devices 441 and 451. Computing devices 441 and 451 may be personal computing devices or servers that include any or all of the elements described above relative to unauthorized activity detection computing device 401.

The network connections depicted in FIG. 4 may include Local Area Network (LAN) 425 and Wide Area Network (WAN) 429, as well as other networks. When used in a LAN networking environment, unauthorized activity detection computing device 401 may be connected to LAN 425 through a network interface or adapter in communications module 409. When used in a WAN networking environment, unauthorized activity detection computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive an indication of a computing device including a spatially aware chip at an entity location;
        receive first additional data associated with the computing device during a first visit to the entity location;
        store the indication of the computing device and the first additional data from the first visit to the entity location;
        detect, at a second visit to the entity location occurring after the first visit to the entity location, the computing device including the spatially aware chip;
        receive second additional data associated with the computing device during the second visit to the entity location;
        retrieve, based on an identifier associated with one of: the computing device or the spatially aware chip, the first additional data;
        analyze the second additional data to detect unauthorized activity, analyzing the second additional data including comparing the second additional data to the first additional data to detect an anomaly and wherein analyzing the second additional data is performed using a machine learning model trained using historical data linking patterns of movement to unauthorized activity;
        responsive to detecting unauthorized activity, generate an alert; and
        transmit the alert to one or more systems.

2. The computing platform of claim 1, wherein the second additional data is analyzed in real-time.

3. The computing platform of claim 1, the instructions further including:
    receive feedback data in response to the transmitted alert; and
    update or validate the machine learning model based on the received feedback data.

4. The computing platform of claim 1, the instructions further including:
    scan to detect additional devices within a predefined distance of the computing device including the spatially aware chip; and
    associate the detected additional devices with the computing device including the spatially aware chip to generate a device fingerprint.

5. The computing platform of claim 1, wherein analyzing the second additional data includes:
    determine a risk score associated with the computing device including the spatially aware chip;
    compare the determined risk score to one or more thresholds; and
    identify one or more mitigating actions based on the comparing.

6. The computing platform of claim 1, wherein the first additional data and second additional data include position data associated with the computing device including the spatially aware chip captured via ultra-wideband communication while the computing device including the spatially aware chip is within the entity location during the first visit and the second visit.

7. A method, comprising:
    receiving, by a computing platform, the computing platform having at least one processor and memory, an indication of a computing device including a spatially aware chip at an entity location;
    receiving, by the at least one processor, first additional data associated with the computing device during a first visit to the entity location;

storing, by the at least one processor, the indication of the computing device and the first additional data from the first visit to the entity location;

detecting, by the at least one processor and at a second visit to the entity location occurring after the first visit to the entity location, the computing device including the spatially aware chip;

receiving, by the at least one processor, second additional data associated with the computing device during the second visit to the entity location;

retrieving, by the at least one processor and based on an identifier associated with one of: the computing device or the spatially aware chip, the first additional data;

analyzing, by the at least one processor, the second additional data to detect unauthorized activity, analyzing the second additional data including comparing the second additional data to the first additional data to detect an anomaly and wherein analyzing the second additional data is performed using a machine learning model trained using historical data linking patterns of movement to unauthorized activity;

responsive to detecting unauthorized activity, generating, by the at least one processor, an alert; and transmitting, by the at least one processor, the alert to one or more systems.

8. The method of claim 7, wherein the second additional data is analyzed in real-time.

9. The method of claim 7, further including:
receiving, by the at least one processor, feedback data in response to the transmitted alert; and
updating or validating, by the at least one processor, the machine learning model based on the received feedback data.

10. The method of claim 7, further including:
scanning, by the at least one processor, to detect additional devices within a predefined distance of the computing device including the spatially aware chip; and
associating, by the at least one processor, the detected additional devices with the computing device including the spatially aware chip to generate a device fingerprint.

11. The method of claim 7, wherein analyzing the second additional data includes:
determining, by the at least one processor, a risk score associated with the computing device including the spatially aware chip;
comparing, by the at least one processor, the determined risk score to one or more thresholds; and
identifying, by the at least one processor, one or more mitigating actions based on the comparing.

12. The method of claim 7, wherein the first additional data and second additional data include position data associated with the computing device including the spatially aware chip captured via ultra-wideband communication while the computing device including the spatially aware chip is within the entity location during the first visit and the second visit.

13. One or more non-transitory computer-readable media storing instructions that, when executed by a computing platform comprising at least one processor, memory, and a communication interface, cause the computing platform to:

receive an indication of a computing device including a spatially aware chip at an entity location;

receive first additional data associated with the computing device during a first visit to the entity location;

store the indication of the computing device and the first additional data from the first visit to the entity location;

detect, at a second visit to the entity location occurring after the first visit to the entity location, the computing device including the spatially aware chip;

receive second additional data associated with the computing device during the second visit to the entity location;

retrieve, based on an identifier associated with one of: the computing device or the spatially aware chip, the first additional data;

analyze the second additional data to detect unauthorized activity, analyzing the second additional data including comparing the second additional data to the first additional data to detect an anomaly, and wherein analyzing the second additional data is performed using a machine learning model trained using historical data linking patterns of movement to unauthorized activity;

responsive to detecting unauthorized activity, generate an alert; and transmit the alert to one or more systems.

14. The one or more non-transitory computer-readable media of claim 13, wherein the second additional data is analyzed in real-time.

15. The one or more non-transitory computer-readable media of claim 13, the instructions further including:
receive feedback data in response to the transmitted alert; and
update or validate the machine learning model based on the received feedback data.

16. The one or more non-transitory computer-readable media of claim 13, the instructions further including:
scan to detect additional devices within a predefined distance of the computing device including the spatially aware chip; and
associate the detected additional devices with the computing device including the spatially aware chip to generate a device fingerprint.

17. The one or more non-transitory computer-readable media of claim 13, wherein analyzing the second additional data includes:
determine a risk score associated with the computing device including the spatially aware chip;
compare the determined risk score to one or more thresholds; and
identify one or more mitigating actions based on the comparing.

18. The one or more non-transitory computer-readable media of claim 13, wherein the first additional data and second additional data include position data associated with the computing device including the spatially aware chip captured via ultra-wideband communication while the computing device including the spatially aware chip is within the entity location during the first visit and the second visit.

* * * * *